United States Patent
Wikström et al.

(10) Patent No.: US 10,743,306 B2
(45) Date of Patent: Aug. 11, 2020

(54) ADAPTIVE TRANSMISSION TIME INTERVAL LENGTH

(71) Applicant: Telefonaktiebolaget LM Ericsson (publ), Stockholm (SE)

(72) Inventors: Gustav Wikström, Täby (SE); Mattias Andersson, Sundbyberg (SE); Laetitia Falconetti, Järfälla (SE); Daniel Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/558,052

(22) PCT Filed: May 11, 2017

(86) PCT No.: PCT/EP2017/061329
§ 371 (c)(1),
(2) Date: Sep. 13, 2017

(87) PCT Pub. No.: WO2017/194673
PCT Pub. Date: Nov. 16, 2017

(65) Prior Publication Data
US 2018/0176909 A1    Jun. 21, 2018

Related U.S. Application Data

(60) Provisional application No. 62/335,809, filed on May 13, 2016.

(51) Int. Cl.
*H04W 72/04* (2009.01)
*H04L 1/00* (2006.01)
(Continued)

(52) U.S. Cl.
CPC ....... *H04W 72/0446* (2013.01); *H04L 1/0007* (2013.01); *H04L 1/0026* (2013.01);
(Continued)

(58) Field of Classification Search
CPC ............ H04W 72/0413; H04W 72/042; H04L 1/0007
See application file for complete search history.

(56) References Cited

U.S. PATENT DOCUMENTS

| | | | |
|---|---|---|---|
| 10,069,613 B2 * | 9/2018 | Nory | ...................... H04L 5/0055 |
| 2017/0111923 A1 * | 4/2017 | Nogami | ............ H04W 72/1263 |

(Continued)

FOREIGN PATENT DOCUMENTS

| | | |
|---|---|---|
| EP | 3179654 A1 | 6/2017 |
| EP | 3439397 A1 | 2/2019 |

(Continued)

OTHER PUBLICATIONS

International Search Report and Written Opinion of the International Searching Authority, PCT/EP2017/061329, dated Jul. 6, 2017, 10 pages.

(Continued)

*Primary Examiner* — Robert C Scheibel
(74) *Attorney, Agent, or Firm* — Sage Patent Group

(57) ABSTRACT

A method in a communication system comprising a radio device and radio access network node, the method comprising and/or initiating a step of setting, in the radio device, a length of a transmission time interval (TTI) in a physical uplink control channel; a step of transmitting control information, by the radio device, over the physical uplink control channel with the set transmission time interval length; and a step of changing the transmission time interval length to be set by said radio device based on a channel or payload characteristic between said radio device and said radio access network node.

30 Claims, 4 Drawing Sheets

(51) Int. Cl.
*H04L 5/00* (2006.01)
*H04L 1/18* (2006.01)
*H04W 76/27* (2018.01)

(52) U.S. Cl.
CPC ..... *H04W 72/042* (2013.01); *H04W 72/0413* (2013.01); *H04L 1/0025* (2013.01); *H04L 1/1812* (2013.01); *H04L 5/0007* (2013.01); *H04L 5/0048* (2013.01); *H04L 5/0057* (2013.01); *H04W 76/27* (2018.02)

(56) References Cited

U.S. PATENT DOCUMENTS

| | | | |
|---|---|---|---|
| 2017/0164363 A1* | 6/2017 | Zhang | H04L 1/00 |
| 2017/0207880 A1* | 7/2017 | Sun | H03M 13/09 |
| 2017/0208575 A1* | 7/2017 | Chen | H04L 5/0048 |
| 2017/0273103 A1* | 9/2017 | Liu | H04W 72/1289 |
| 2017/0290008 A1* | 10/2017 | Tooher | H04L 1/0007 |
| 2017/0311326 A1* | 10/2017 | Wong | H04W 72/0453 |
| 2018/0213530 A1* | 7/2018 | Mochizuki | H04W 72/04 |
| 2018/0287742 A1* | 10/2018 | Feng | H04L 1/1812 |
| 2018/0287743 A1* | 10/2018 | Byun | H04L 1/18 |
| 2018/0302916 A1* | 10/2018 | Lee | H04L 5/00 |
| 2018/0323939 A1* | 11/2018 | Nory | H04L 5/0055 |
| 2018/0324834 A1* | 11/2018 | Sebire | H04L 1/00 |
| 2018/0331816 A1* | 11/2018 | Harada | H04L 1/1664 |
| 2018/0332605 A1* | 11/2018 | Pelletier | H04W 72/1289 |
| 2018/0343047 A1* | 11/2018 | He | H04L 1/1812 |
| 2018/0359068 A1* | 12/2018 | Kim | H04W 72/0446 |
| 2018/0359745 A1* | 12/2018 | Yeo | H04L 1/18 |
| 2018/0375619 A1* | 12/2018 | Hwang | H04B 7/26 |
| 2019/0020459 A1* | 1/2019 | Hooli | H04L 5/0053 |
| 2019/0021072 A1* | 1/2019 | Horiuchi | H04L 1/0003 |
| 2019/0068334 A1* | 2/2019 | Stern-Berkowitz | H04L 1/1822 |
| 2019/0068423 A1* | 2/2019 | Hwang | H04L 5/00 |
| 2019/0074936 A1* | 3/2019 | Lee | H04L 1/1819 |
| 2019/0150148 A1* | 5/2019 | Ouchi | H04W 28/04 370/336 |

FOREIGN PATENT DOCUMENTS

| | | |
|---|---|---|
| WO | WO 2016/029736 A1 | 3/2016 |
| WO | WO 2016/040290 A1 | 3/2016 |
| WO | 2017/076459 | 5/2017 |
| WO | WO 2017/167755 A1 | 10/2017 |

OTHER PUBLICATIONS

"Design of sPUCCH for shortened TTI," Agenda Item 7.3.10.2, CATT, (R1-162298) 3GPP TSG RAN WG1, Meeting #84bis, Busan, Korea, Apr. 11-15, 2016, 3 pages.

"PUCCH Design for Shortened TTI," Agenda Item 7.3.10.2, NTT DOCOMO, Inc. (R1-163172) 3GPP TSG RAN WG1, Meeting #84bis, Busan, Korea, Apr. 11-15, 2016, 6 pages.

"Control Signaling Enhancements for Short TTI," Agenda Item 6.2.9.2, Huawei, HiSilicon, (R1-156461) 3GPP TSG RAN WG1, Meeting #83, Anaheim, USA, Nov. 15-22, 2015, 6 pages.

"Study of Shorter TTI for Latency Reduction," Agenda Item 7.10.2, Ericsson (Tdoc R2-154740) 3GPP TSG RAN WG2, Meeting #91bis, Malmö Sweden, Oct. 5-9, 2015, 8 pages.

Office Action dated Sep. 20, 2019 for Japanese Patent Application No. 2018-558155, 9 pages.

"Design of DL DCI for short TTI", Agenda Item 7.3.4.2, Ericsson, (R1-160931) 3GPP TSG-RAN WG1, Meeting #84, Malta, Feb. 15-19, 2016, 5 pages.

"General design principles for 5G new radio interface: Key functionalities", Agenda Item 8.1.1.1, Samsung, (R1-162172) 3GPP TSG RAN WG1 #84bis, Busan, Korea, Apr. 11-15, 2016, 3 pages.

Office Action dated Sep. 17, 2019 for European Patent Application No. 17723354.1, 4 pages.

\* cited by examiner

Fig. 1
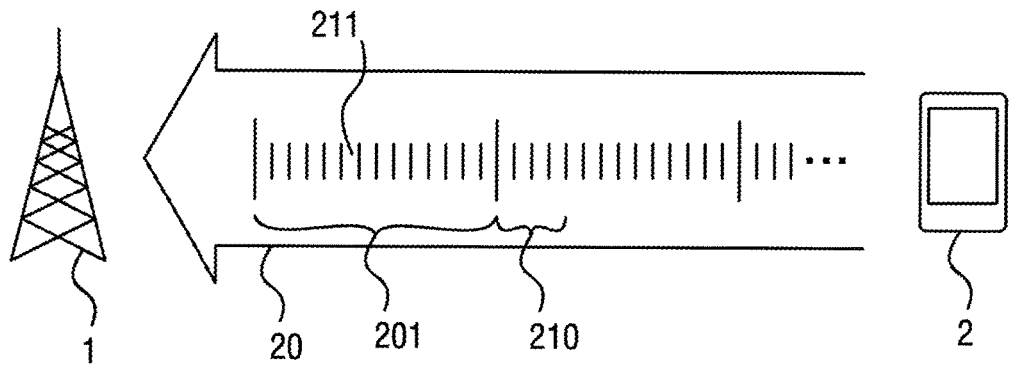
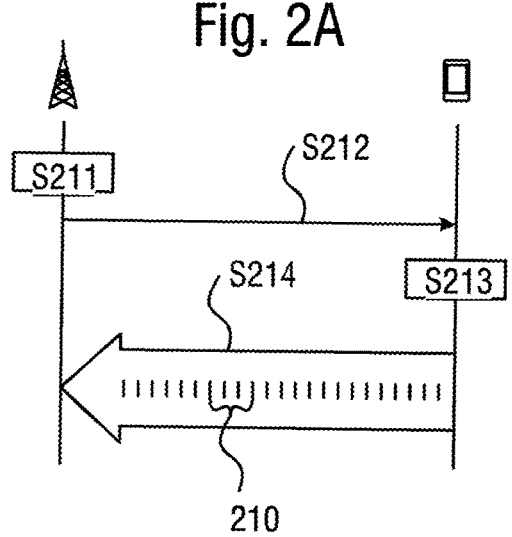
Fig. 2A
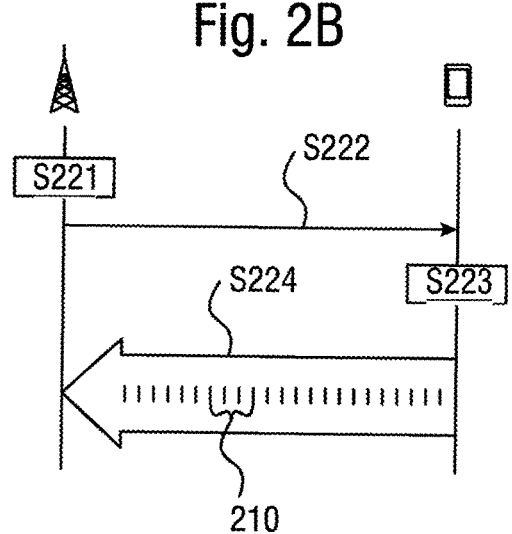
Fig. 2B
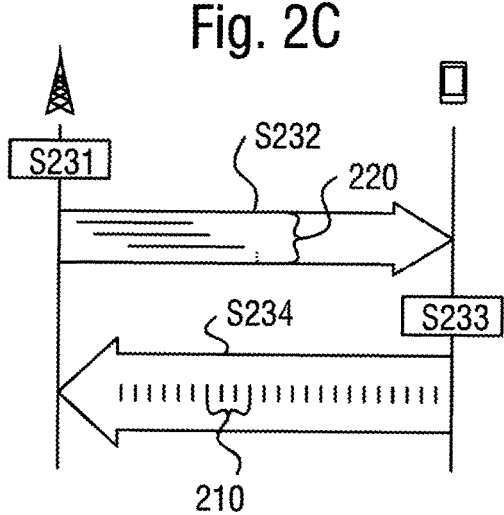
Fig. 2C
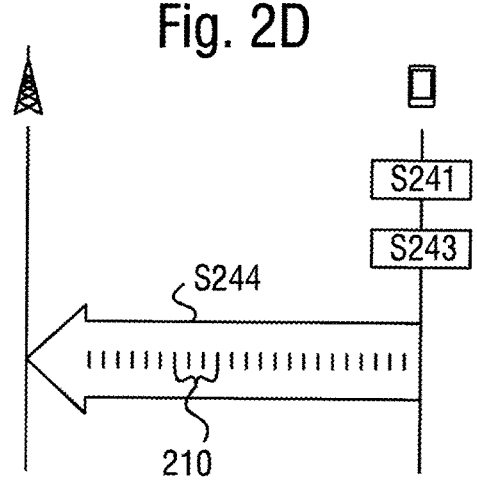
Fig. 2D

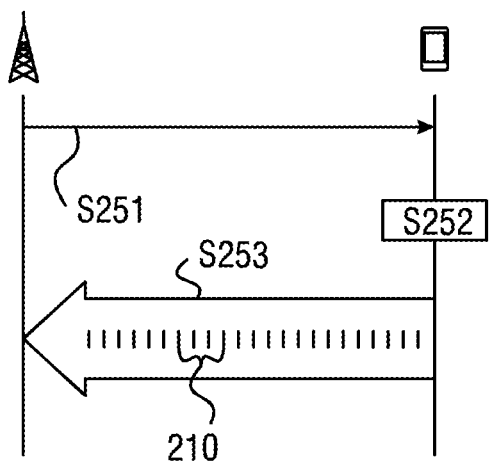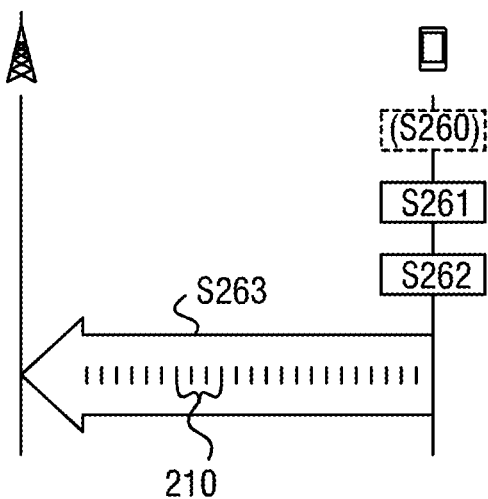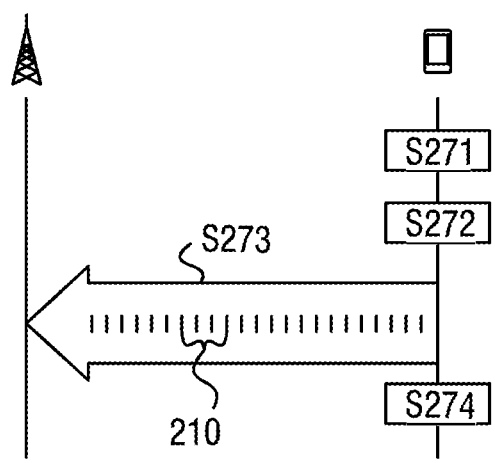

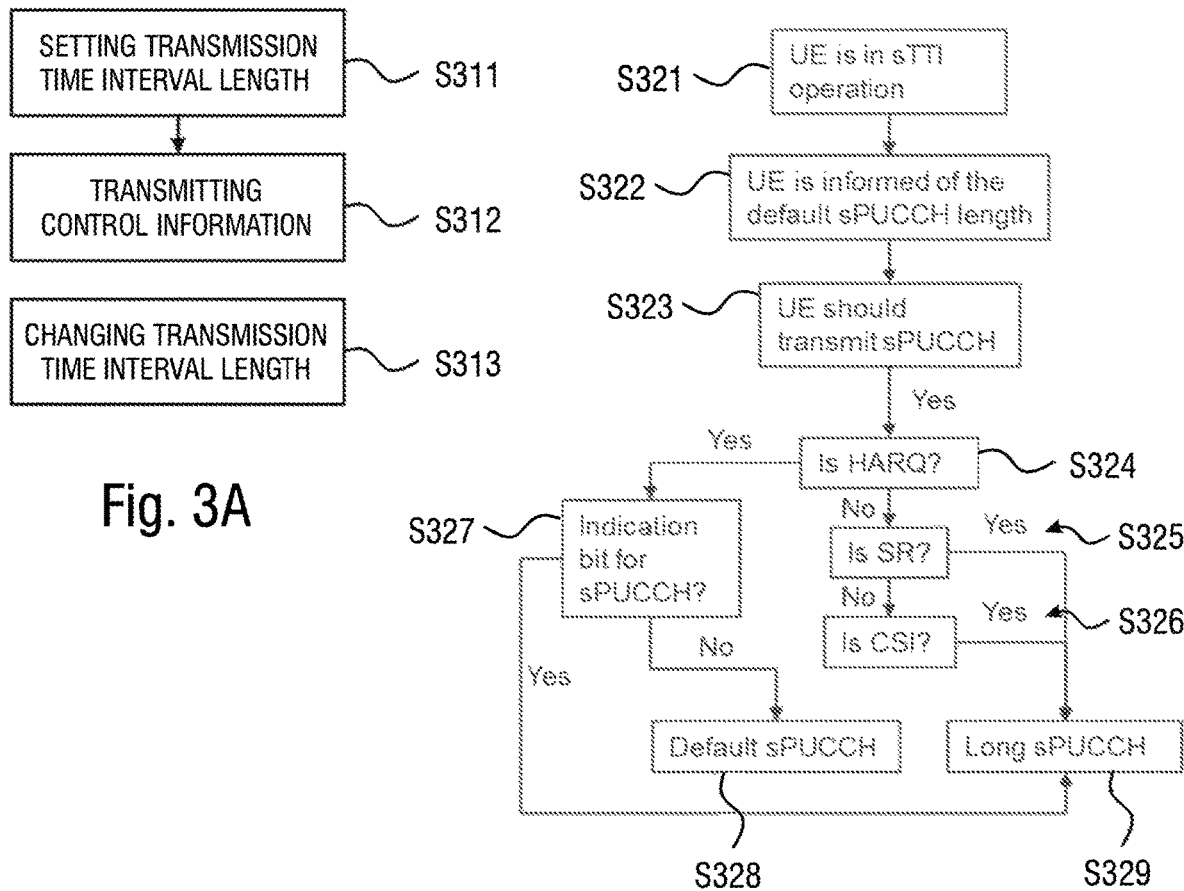
Fig. 3A
Fig. 3B
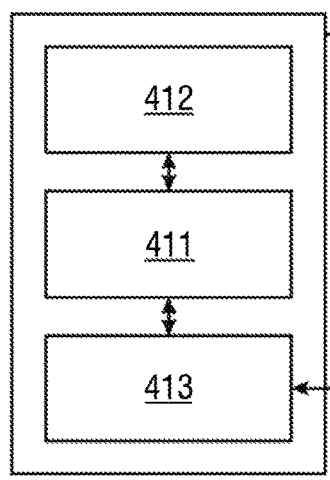
Fig. 4A
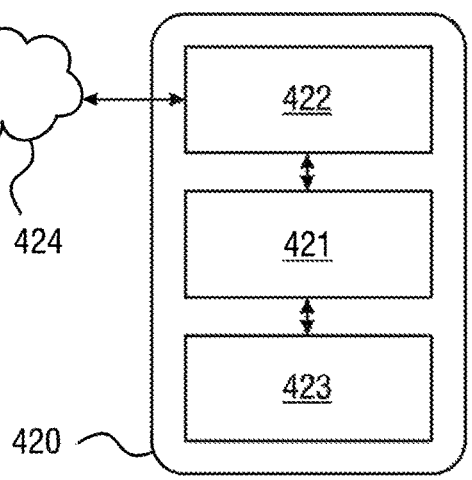
Fig. 4B

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
|  | R | D | D | R | D | R | D | R | D | D | R | D | R | D |
| sPUCCH | 0 |  |  | 1 |  | 2 |  | 3 |  |  | 4 |  | 5 |  |

FIGURE 5

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
|  | D | R | D |  |  |  |  | D | R | D |  |  |  |  |
|  |  |  |  | D | R | D | D |  |  |  | D | R | D | S |
| sPUCCH | 0 |  |  |  |  |  |  | 1 |  |  |  |  |  |  |

FIGURE 6

ADAPTIVE TRANSMISSION TIME INTERVAL LENGTH

CROSS REFERENCE TO RELATED APPLICATIONS

This application is a 35 U.S.C. § 371 national stage application of PCT International Application No. PCT/EP2017/061329, filed on May 11, 2017, which claims domestic priority to U.S. Provisional Application No. 62/335,809, filed on May 13, 2016, the disclosures and content of which are incorporated by reference herein in its entirety.

TECHNICAL FIELD

The present disclosure generally relates to systems comprising a radio device and a radio access network node. More specifically, the present disclosure relates to setting a length of a transmission time interval in a physical uplink control channel (PUCCH). The present invention likewise relates to corresponding methods of operating a radio device, methods of operating a radio access network node, radio devices, and radio access network nodes.

BACKGROUND

Modern wireless communication networks are powerful systems that are able to convey a large amount of data to individual radio devices using distributed radio transmissions from radio access network nodes. The data throughput of such wireless communication systems has drastically increased over the years, so that not only voice but also video and other large data files can be exchanged from and to individual radio devices. The data is usually exchanged in the form of so-called data packets (or simply packet) which can be identified as some sort of chunk of data carrying respective control information that allows the network infrastructure to route a packet from a source to a given destination device.

Packet latency is one of the performance metrics that vendors, operators and also end-users (e.g. via speed test applications) regularly measure. The measured latency usually indicates some kind of time figure that in turn indicates a time or delay that a packet requires to arrive at a given destination. In other words, the lower the latency the faster the network performance may be perceived. Latency measurements can be generally performed in all phases of a radio access network system's lifetime, e.g. when verifying a new software release or system component, when deploying a system or when the system is in operation. For example, a shorter latency than previous generations of 3GPP ($3^{rd}$ Generation Partnership Project) implementations was one performance metric that guided the design of the so-called Long Term Evolution (LTE) technology. As compared to previous systems, LTE is generally recognized by end-users to be a system that provides faster access to internet and lower data latencies than previous generations of mobile radio technologies.

However, packet data latency plays not only a role for the perceived responsiveness of the system, but it can be also a parameter that indirectly influences the throughput of the system. Conventionally, HTTP/TCP is the dominating application and transport layer protocol suite used on the internet. According to HTTP Archive (accessible for example via "http://httparchive.org/trends.php") the typical size of HTTP based transactions over the internet are in the range of a few 10's of Kbyte up to 1 Mbyte. In this size range, the TCP slow start period may be a significant part of the total transport period of the packet stream. In other words, the smaller the amount of data of a transaction is, the more pronounced is the influence of the involved control signaling on the overall perceived "speed" of a network. During the mentioned TCP slow start the performance can be identified as being mainly limited by latency. Therefore, it can be shown that improving the latency can improve the average throughput for such types of TCP based data transactions.

However, the isolated reduction of control signaling in data packet communication may not provide a reliable solution, since an improvement and speed, i.e. a lowering of the involved latency, may result in an unreliable exchange of control data between the involved parties, i.e. a radio device and a corresponding radio access network node, since, for example, redundancy and other error detection and correction mechanisms may suffer or may even become dysfunctional when the amount of control data is reduced. More specifically, a shortened control channel for the radio device may no longer work reliably when the device gets out of coverage in a power limited region. This is because the robustness of the transmission in this case relates to the number of available symbols.

There is therefore a need for improved system of radio devices and radio access network nodes that are able to both reduce the latency and at the same time maintain reliable control information exchange.

SUMMARY

The mentioned problems and drawbacks are addressed by the subject matter of the independent claims. Further preferred embodiments are defined in the dependent claims.

According to one embodiment of the present invention, a method is provided in a communication system comprising a radio device and radio access network node, the method comprising and/or initiating a step of setting, in the radio device, a length of a transmission time interval (TTI) in a physical uplink control channel; a step of transmitting control information, by the radio device, over the physical uplink control channel with the set transmission time interval length; and a step of changing the transmission time interval length to be set by said radio device based on a channel or payload characteristic between said radio device and said radio access network node.

According to another embodiment of the present invention, a method is provided of operating a radio device capable of being in communication with a radio access network node, the method comprising a step of setting, in the radio device, a length of a transmission time interval (TTI) in a physical uplink control channel; and a step of transmitting control information, by the radio device, over the physical uplink control channel with the set transmission time interval length.

According to another embodiment of the present invention, a method is provided of operating a radio access network node capable of being in communication with a radio device, the method comprising a step of changing the transmission time interval length based on a channel or payload characteristic between said radio device and said radio access network node, wherein the radio device sets a length of a transmission time interval (TTI) in a physical uplink control channel to the changed transmission time interval length; and a step of transmitting, toward the radio device, an indicator on the changed transmission time interval length.

According to another embodiment of the present invention, a radio device is provided that comprises a processing circuit and a memory, the memory storing code to instruct the processing circuit to implement one or more method embodiments as described by the present disclosure.

According to yet another embodiment of the present invention, a radio access network node is provided that comprises a processing circuit and a memory, the memory storing code to instruct the processing circuit to implement one or more method embodiments as described by the present disclosure.

BRIEF DESCRIPTION OF THE DRAWINGS

Embodiments of the present invention, which are presented for better understanding the inventive concepts but which are not to be seen as limiting the invention, will now be described with reference to the figures in which:

FIG. 1 shows a schematic view of a general system configuration according to an embodiment of the present invention;

FIGS. 2A to 2G show schematic sequence diagrams of changing and setting the transmission time interval length according to corresponding embodiments of the present invention;

FIGS. 3A and 3B show schematic sequence diagrams of method embodiments of the present invention;

FIG. 4A shows a schematic view of radio access network node according to an embodiment of the present invention;

FIG. 4B shows a schematic view of a radio device according to an embodiment of the present invention;

FIG. 5 shows an example of a 2/3 symbol sPUCCH according to an embodiment of the present invention; and FIG. 6 shows an example of a 7 symbol sPUCCH with frequency hopping according to an embodiment of the present invention.

DETAILED DESCRIPTION

FIG. 1 shows a schematic view of a general system configuration according to an embodiment of the present invention. The system comprises at least one radio device 2 in the form of a piece of user equipment (UE), a wireless communication device, a mobile telephone, smartphone, internet-of-things (IoT) client, or any other suitable data source for conveying data over a radio access toward a wireless communication system. Correspondingly, the system comprises at least one radio access network node 1 in the form of a radio base station, an eNB or any other suitable type of node that can act as a radio access point.

As common to most wireless communication networks a channel 20 is set up so as to convey information from, for example, the radio device 2 to the radio access network node 1. In an embodiment of the channel 20 is a physical uplink control channel (PUCCH) that can be configured in the form of sub-frames 201 with a given number of symbols 211. The latter symbols can be orthogonal frequency division multiplexing (OFDM) symbols or single carrier frequency division multiple access (SC-FDMA) symbols. Normally, the sub-frame 201 can be configured as a (for example 14) of individual symbols 211. Moreover, a transmission time interval (TTI) is defined that determines how long one individual transmission is in terms of number of symbols. For example, a TTI may coincide with the length of a sub-frame so that the sub-frame 201 is the transmission unit which is conveyed, here, from the radio device 2 to the radio access network node 1.

In the present embodiment, the radio device 2 is configured to set the length of a transmission time interval in the physical uplink control channel 20. Specifically, the radio device 2 is configured to set the length of the transmission time interval in terms of numbers of symbols and possibly also shorter than the length of the sub-frame 201. As a consequence, the radio device 2 can set the transmission time interval length to a number of 4 symbols 210 as shown in the figure, or to any other number of symbols ranging from 1 to an upper value, for example, 14.

The radio device 2 is further configured to transmit control information over the physical uplink control channel 20 with the set transmission time interval length, i.e. the set 210 of symbols toward the radio access network node 1. The present embodiment further considers that the transmission time interval length (the length to which the radio device 2 sets the TTI length) is changed based on a channel or payload characteristic between said radio device and said radio access network node, which can be any one of channel characteristic in the sense of a channel condition between said radio device and said radio access network node or a payload characteristic in the sense of a payload data length for payload transmitted between said radio device and said radio access network node.

More details on possible mechanisms to change the transmission time interval length to be set by the radio device 2 are now explained in conjunction with the following embodiments together with FIGS. 2A to 2G. Some of these embodiments may consider specifically the choice of PUCCH for performing the DL HARQ, where the radio access network node can indicate the use of a longer PUCCH length than the default for the UL TTI length to the short TTI radio device.

FIG. 2A shows a schematic sequence diagram of changing and setting the transmission time interval length according to an embodiment of the present invention. Specifically, this embodiment envisages that the radio access network node 1 is configured to determine (change) in a step S211 an indicator of the transmission time interval and to transmit this indicator to the radio device 2 in a step S212. In a step S213 the radio device 2 can then set the transmission time interval length and transmit accordingly the control data in a step S214 in a specific transmission time interval 210 corresponding to the specific number of symbols. The indicator can be transmitted generally to one specific radio device or also to a—in some way or other—selected group of radio devices. In the latter case a broadcast or multicast mechanism can be involved for influencing the TTI length to be set for a plurality of radio devices.

The mentioned indicator can be in a corresponding embodiment a bit field in downlink control information (DCI) that is received by the radio device 2. In this way it is possible that the radio access network node can control how the radio device sets the transmission time interval length. Correspondingly, the radio access network node can be aware of what length the radio device 2 will use, so that decoding the control information from the radio device 2 can be accomplished easily.

In other embodiments, a bit field in the Fast downlink DCI is used to indicate the use of a specific, i.e. shorter or longer, TTI length and with this the PUCCH format. In this way, the radio access network node (e.g. an eNB) can decide to trigger the usage of a longer short PUCCH (sPUCCH) format for several reasons. One reason may be for extended coverage if measurements show poor channel conditions for this radio device (e.g. UE). Another reason can be to accomplish a higher payload. Based on its scheduling decision, the sPUCCH may need to convey more bits than usual. This embodiment is further explained below in conjunction with FIG. 3B.

In a further embodiment, the bit field, for example as part of a DCI message, may comprise more than one bit. In this case, different settings of the bit sequence may be defined to correspond to different PUCCH resources, which may be of different lengths (PUCCH/TTI lengths). For example, if the bit field is of length 2, the settings can correspond to "00": short PUCCH format; "01": long PUCCH format, resource 1; "10": long PUCCH format, resource 2; and "11" long PUCCH format, resource 3. In this case resource 1, 2, or 3 may be identified as three different PUCCH resources that can be configured by higher layer signaling. The resources can differ by, for example, occupying different physical resource blocks (PRBs), using different orthogonal cover codes, or using different cyclic shifts for their Zadoff-Chu sequences.

FIG. 2B shows a schematic sequence diagram of changing and setting the transmission time interval length according to an embodiment of the present invention. Specifically, this embodiment envisages that the radio access network node 1 is configured to determine an indicator for changing the transmission time interval length in a step S221 and to transmit this indicator in the form of an aggregation level to the radio device 2 in a step S222. In a step S223 the radio device 2 can then set the transmission time interval length and transmit accordingly the control data in a step S224 in a specific transmission time interval 210 corresponding to the specific number of symbols. In particular, the mentioned aggregation level (AL) can be the one of downlink control information (DCI), or an aggregation level (AL) of the Fast DL DCI can be used to set the length of TTI and with this the PUCCH format. As an example, AL=1 would indicate the short PUCCH resource, while AL>1 would indicate the longer format. If three formats are available, AL=2 could indicate an intermediate format and AL>2 could indicate the longest format.

In a further embodiment, the transmission time interval length to be set can be changed by the radio device based on the last decoded downlink control information (DCI) or last decoded aggregation level (AL). Such embodiment further consider that the radio device, when it is about to transmit a scheduling request (SR), it may no longer use a longer PUCCH format than the default (cf. also disclosure in conjunction with FIG. 3B). The radio device may choose the PUCCH format for SR based on the AL of the last Fast DL or UL DCI the UE has decoded.

In a further embodiment, the radio device can be configured to use the last DCI or AL received within a certain time interval before the transmission. If the radio device transmission occurs at time T1, then the radio device may use the last DCI or AL occurring before time T1−T2 to set the TTI length, where T2 can be identified as kind of waiting delay time. In other words, the radio device's change of the TTI length through DCI or AL signaling are not applied immediately, but only take effect after a waiting time T2.

In a further embodiment, when transmitting HARQ feedback, the radio device could assess the DCI messages or AL levels that were used to schedule the downlink (DL) transmissions for which HARQ is being fed back in the current PUCCH transmission and choose/change the TTI length according to the latest of these physical downlink control channel (PDCCH) transmissions which usually convey the DCI messages. In yet another embodiment, not the latest signaled TTI length is used, but the largest TTI length from those signaled within a certain time interval or among those DCI messages scheduling the DL transmissions for which HARQ bits are being transmitted are applied.

FIG. 2C shows a schematic sequence diagram of changing and setting the transmission time interval length according to an embodiment of the present invention. Specifically, this embodiment envisages that the radio access network node 1 is configured to determine an indicator for changing the transmission time interval length in a step S231. The determined indicator in turn is configured to determine a number 220 of layers in a downlink transmission S232, wherein said number is in relation to said transmission time interval length. The downlink transmission is performed accordingly in step S232 and with this implicitly conveys an indicator to the transmission time interval length to be set toward the radio device 2. In a step S233 the radio device 2 can then set the transmission time interval length and transmit accordingly the control data in a step S234 in a specific transmission time interval 210 corresponding to the specific number of symbols. In other words, the number of layers in the DL transmission is used to set the PUCCH length. For example, if only one layer is transmitted, the channel is deemed to be poor and the longest PUCCH length, or correspondingly the longest TTI length, can be used to ensure coverage.

FIG. 2D shows a schematic sequence diagram of changing and setting the transmission time interval length according to an embodiment of the present invention. Specifically, the transmission time interval length to be set is changed by the radio device 2 in a step S241. In a step S243 the radio device 2 can then set the transmission time interval length and transmit accordingly the control data in a step S244 in a specific transmission time interval 210 corresponding to the specific number of symbols. In a further embodiment, the radio device changes in step S241 the transmission time interval length in relation to an amount of payload data to be transmitted toward the radio access network node.

In other words, the radio device autonomously can uses a longer sPUCCH format (TTI length) if the payload is more than a threshold, e.g. 3 bits. The radio access network node can know when to expect sPUCCH with large payload and is thus aware that the UE changes the sPUCCH format. This situation may occur for several reasons with short TTI operation. A typical case is when the UL (uplink) TTI length is larger than the DL (downlink) TTI length. Consequently, acknowledgments for several DL short TTIs can be multiplexed in the same sPUCCH (short PUCCH) transmission. This may also happen in case of HARQ feedback for a large number of MIMO (multiple input multiple output) layers, in case of HARQ feedback for carrier aggregation with a large number of scheduled carriers, or also in case of TDD. To exemplify the present embodiment further, the radio device may automatically switch to a longer sPUCCH format if a secondary cell is scheduled. Further when utilizing frame structure 2 (FS2) or frame structure 3 (FS3) the radio device may automatically switch to a longer PUCCH format if there are multiple DL short TTIs that map to the same short TTI in UL. When switching to a longer PUCCH format the amount of sTTI in DL for which HARQ feedback is transmitted for in UL may further increase simply due to that the sTTI length increases.

FIG. 2E shows a schematic sequence diagram of changing and setting the transmission time interval length according to an embodiment of the present invention. Specifically, in a step S251 a transmission configuration using radio resource control (RRC) signaling takes place. In a step S252 the radio device 2 can then set the transmission time interval length in relation to said transmission configuration using radio resource control (RRC). Accordingly, the radio device can transmit the control data in a step S253 in a specific transmission time interval 210 corresponding to the specific number of symbols. In other words, the radio device may use a longer sPUCCH format depending on how it was configured for transmission using RRC signaling. For instance, if the radio device is configured with carrier aggregation (CA), the radio device can use the longer sPUCCH format as a default. If the radio device is configured with a longer TTI length in UL than in DL, the radio device can use the longer sPUCCH format as a default.

FIG. 2F shows a schematic sequence diagram of changing and setting the transmission time interval length according to an embodiment of the present invention. Specifically, the transmission time interval length to be set is changed in step S261 by the radio device in relation to a measured channel quality. In a step S262 the radio device 2 can then set the transmission time interval length in relation to said measured channel quality. Accordingly, the radio device can transmit the control data in a step S263 in a specific transmission time interval 210 corresponding to the specific number of symbols. In a further embodiment, the channel quality is measured in an optional step S260 by the radio device which may comprise determining a reference signal received power (RSRP) or a channel quality indicator (CQI).

As an example, the radio device may choose a longer PUCCH format if a measured quality index is below a predefined threshold. The measured quality index can, be based on RSRP (reference Signal received Power), CQI (channel quality Indicator) or an estimate of the UL received power. Further, the radio device may use the longest PUCCH resource before it has decoded any Fast DCI, in order to ensure good coverage.

FIG. 2G shows a schematic sequence diagram of changing and setting the transmission time interval length according to an embodiment of the present invention. Specifically, the transmission time interval length to be set is changed by the radio device in step S271 so that a shortest (e.g. a length equivalent to 1 symbol or 2 symbols) transmission time interval length is used for a scheduling request (SR). In a step S272 the radio device 2 can then set the transmission time interval length accordingly, and the radio device can transmit the control data in a step S273 for the scheduling request with a specific transmission time interval 210 corresponding to the specific number of symbols. In a subsequent step S274 the transmission time interval length can be increased for a next scheduling request (SR) if no scheduling is performed within a predetermined time interval.

Here, the radio device may use the shortest PUCCH format for SR that it is operating for the first SR attempt. If the radio access network node does not schedule or is not instructed to schedule the radio device within a certain time interval, then the radio device can transmit a new SR and changes the length to a longer PUCCH format. In a specific embodiment the radio device can fall back to report SR with sub-frame long PUCCH format, i.e. PUCCH format 1. To allow this type of operation the radio device may be configured with multiple PUCCH format resources for SR, potentially one per TTI length. Another possibility is that the resource that the SR is reported on is derived implicitly based one of the configured resources. The radio access network node may in a further embodiment schedule the radio device based on sTTI if the SR is received on a sTTI and on a sub-frame long TTI if the SR is received on the sub-frame long TTI. This can be implemented to match the coverage in UL for the radio device.

In further embodiments, the radio device can be configured to repeat a scheduling request SR a number of times, instead of changing to a longer PUCCH/TTI format or length. This number of repetition times can be predetermined. Especially, if the radio device is allowed to send an SR in every TTI, the radio device can send the SR in N consecutive TTIs. N here is an integer that is either predetermined, or signaled to the radio device. There can also be more than one set of integers N from which the radio device can choose. In this way, the radio device can be configured to repeat a scheduling request using a shortened TTI until scheduling takes place.

In general, embodiments of the present invention may thus improve the radio resource efficiency by reducing the latency. In turn, a lower packet data latency could increase the number of transmissions possible within a certain delay bound. As one consequence, higher Block Error Rate (BLER) targets could be used for the data transmissions freeing up radio resources potentially improving the capacity of the system.

One area to address when it comes to packet latency reductions may be the reduction of transport time of data and control signaling, by addressing the length of a transmission time interval (TTI). In LTE release 8, for example, a TTI corresponds to one sub-frame (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In the context of LTE release 13, for example, it is further contemplated to specify transmissions with shorter TTIs that are shorter than the LTE release 8 TTI.

Generally, embodiments of the present invention may assume that it is decided to shorten the TTIs in the sense of a "sub sub-frame (SSF)" concept, where a unit of a shortened TTI corresponds, as a part of a sub-frame, a sub-subframe. The shorter TTIs (SSF) can be decided to have any duration in time and comprise resources on a few number of OFDM or SC-FDMA symbols less than 14 within a 1 ms SF. As one example, the duration of the SSF may be 0.5 ms, i.e. seven OFDM or SC-FDMA symbols for the case with normal cyclic prefix. The shortest TTI may be identified as being one symbol long.

A short TTI UE can be configured for short TTI operation by being assigned a group sTTI-RNTI (radio network temporary identifier). The radio device may then search the common search space of the PDCCH for "slow grants" scrambled with sTTI-RNTI. This grant may contain the frequency allocation for a DL and an UL short TTI band to be used for short TTI operation. After decoding such a grant the radio device can be in short TTI operation and may extend its search space to an in-band control channel, also defined by the slow grant. So called Fast DCI (Downlink Control Information) may be transmitted in-band in the sPDCCH search space of the DL sTTI band. The DCI can contain DL assignment (Fast DL DCI) short TTI or uplink grants (Fast UL DCI).

In addition and connected to the slow grant, one or more short PUCCH (sPUCCH) resources can be defined, either explicitly (over e.g. RRC) or implicitly (predefined) in the UL. Multiple sPUCCH resources of different TTI can be defined. These different sPUCCH resources may differ in format, length and payload. The radio device can be informed of the default sPUCCH length through the used short TTI configuration, that is the DL and UL TTI length. In a conventional technique (LTE Release 8), when the radio device is scheduled to transmit UL data over PUSCH at the same time as uplink control information (UCI), and the radio device is not configured to transmit PUSCH and PUCCH simultaneously, the UCI may be separately encoded and placed in predetermined resource elements (REs), which may then not be used for transmitting UL data. For a shorter PUSCH a similar solution can be contemplated. In general, however, it is noted that the PUCCH and PUSCH may have different lengths in the sense that they may employ different TTIs.

Embodiments of the present invention may thus address that with short PUCCH the radio device risks going out of coverage if it is in a power limited region. This may be because the robustness of the transmission in this case relates to the number of transmitted symbols. The same problem may arise for UCI on PUSCH, where the available power used for an OFDM symbol is divided between UCI and UL data.

In the case of PUCCH for CSI and when CSI is scheduled (indicated in the Fast DCI or configured with a periodicity) the radio device may switch autonomously to the longest PUCCH format. The switch may be done to provide sufficient payload (cf. FIG. 33). A further embodiment is that the radio device is configured with a multitude of PUCCH format resources for the purpose of reporting on periodic CSI. The resource may be corresponding to OFDM symbols lengths below or equal to 7 and may also include a resource that corresponding to PUCCH format 2 or similar format that correspond to roughly a sub-frame in length (e.g. 14 or 13 OFDM symbols). The radio device may switch reporting between the different TTI length depending on the number of reported bits, the amount of required transmit power, indication in the fast DCI or the periodicity of the reported entity. The TTI length for report may be different for example for RI and CSI as these are configured with different reporting periodicity and also may require different error rates. The rank is more important to receive correctly compared to the CSI, although the rank as typically few number of bits.

In the case of PUCCH in TDD (time division duplex) operation, however, the PUCCH length may be connected to the TDD configuration and TTI length. Since the payload may depend on the number of TTI that needs to be acknowledged in the PUCCH, the radio device and the radio access network nod can employ a table for the different combinations and set the PUCCH length accordingly.

In the case of several possible PUCCH lengths, as in some embodiments as part of the present disclosure, the PUCCH length for HARQ feedback for a certain DL assignment may be determined based on the DCI message, or characteristics of the PDCCH transmission that carries the DCI message, that schedules this DL assignment. In the case of a longer PUCCH length, or TDD operation, or CA operation, HARQ feedback from more than one DL assignment can be carried in the same PUCCH transmission, and mechanisms may be contemplated to determine the PUCCH length in this case. In one embodiment, the PUCCH length may be determined based on the latest received DCI message or RRC configuration within a certain time period. In a further embodiment, when several PUCCH lengths are possible based on received DCI messages or RRC configurations, the largest one can be chosen.

Further embodiments of the present invention address an increasing of the coverage for UCI on a physical uplink shared channel (PUSCH). In one set of such embodiments, if the radio device uses a longer PUCCH based on one of the rules as described elsewhere in the present disclosure and where it is scheduled to transmit UL data over a PUSCH that occupies fewer OFDM symbols than a predefined threshold, the radio device may use a longer PUSCH to ensure correct reception of the UCI. Here, the PUSCH transmissions may differ in length depending on whether the radio device has received the corresponding DCI messages, or RRC configurations, or made the corresponding channel measurements to use a longer PUCCH, and thus the radio access network node may take into account that the PUSCH length from the radio device may differ as compared to a given assumption.

According to further embodiments, when sending UCI over PUSCH, the UCI may be channel coded using a block code, a convolutional code, or a combination of these. If the radio device is instructed or determines, for example in line with one embodiment as described elsewhere in the present disclosure, that the scheduled PUSCH transmission does not provide coverage for the UCI transmission, the radio device can split the encoded UCI into more than one part. The first part can be transmitted on the scheduled PUSCH transmission. The remaining parts can be transmitted on a PUCCH resources using DFT-spread OFDM. If another PUSCH transmission is scheduled close in time to the first PUSCH transmission, some of the remaining parts can be transmitted at the same time as this PUSCH transmission, using the same puncturing or mapping scheme used for the first part. If a planned PUCCH transmission overlaps with a scheduled PUSCH transmission and the PUCCH transmission starts before the PUSCH transmission, the first part of the encoded UCI can instead be transmitted on PUCCH using DFT spread OFDM and the second part is transmitted on PUSCH (cf. LTE, Rel. 8).

In further embodiments, if the radio device is instructed or determines, for example in line with one embodiment as described elsewhere in the present disclosure, that the scheduled PUSCH transmission does not provide coverage for the UCI transmission, the radio device may transmit the PUSCH transmission without UCI, and then later transmits the UCI over PUCCH.

FIG. 3A shows a schematic sequence diagram of a general method embodiment of the present invention. This method embodiment considers a communication system that at least comprises a radio device and radio access network node, although some or all steps can be performed only in the radio device, and some steps may be performed in the radio access network node or another network entity that can initiate corresponding actions in the radio access network node. The general method embodiment comprises or initiates a step S311 of setting, in the radio device, a length of a transmission time interval (TTI) in a physical uplink control channel and a step S321 of transmitting control information, by the radio device, over the physical uplink control channel with the set transmission time interval length. At any time before or after that, the method embodiment comprises or initiates a step S331 of changing the transmission time interval length to be set by said radio device based on a channel or payload characteristic between said radio device and said radio access network node.

FIG. 3B shows a schematic sequence diagram of another method embodiment of the present invention. Specifically, the radio device (e.g. UE) is set into an sTTI operation in step S321, and the radio device is informed of the corresponding default sPUCCH length in step S322. For example, this may be set to a minimum length of, e.g., a length of one symbol. In a step S323 it is determined that the radio device should transmit control information on a correspondingly shortened physical uplink control channel (sPUCCH). A determination is now made whether the sPUCCH relates to HARQ (step S324), an SR (step S325), or CSI (step S326), and the method, accordingly, proceeds to step S327 of determining whether there is an indication bit for sPUCCH or step S329 of using a longer sPUCCH. If in step S327 it is determined that there is no indication bit for sPUCCH, a default sPUCCH is set in step S328. The present embodiment may specifically consider the case of multiplexing CSI with HARQ-ACK and potentially SR that only occurs if the radio device is configured with simultaneous reporting of the corresponding information. Otherwise the radio device may only transmit HARQ-ACK and a potential SR. If the SR occasion collides with a CSI reporting occasion the radio device may in one embodiment only report SR and by that dropping the CSI report.

FIG. 4A shows a schematic view of radio access network node according to an embodiment of the present invention. Specifically, the node 410 may comprise or may access to a processing circuit 411, memory 412, and a communication device 413. Over the latter, the node 410 may exchange data from and to one or more network(s) 414 and/or a radio environment 414. The node 410 may thus be implemented as, for instance, a server, a computer, or processing resources provided by a data center or any suitable network element (base station, eNB, etc.). Likewise, the node 410 may be as such outside or inside the network 414, wherein in the latter case any network node or element may be provided with the corresponding functionalities.

Generally, the mentioned processing circuit 411 may be a processing unit, a processing unit collection, CPU, a share of a data/processing center and so on. The processing circuit 411 has generally accessing and can control the memory 412 and the communication device to implement at least parts of one or more embodiments that are described in conjunction with the present disclosure. Specifically, the memory 412 may store code instructing the processing circuit 411 during operation to implement or initiate any method step as disclosed to take place in or for the radio access network node 1. In relevant embodiments, the memory 412 may comprise code to instruct the processing circuit 411 in operation to change the transmission time interval length to be set by a radio device based on a channel or payload characteristic between said radio device and said radio access network node.

In one case the node 410 implements the respective functionalities on his own, whereas in other cases the functionality as such is implemented remotely from the node 410 and the node 410 is instructed via the network 414 by some other processing circuit as part of, for example, a data center. In the latter case, the data center may for example determine to change the transmission time interval length to be set by said radio device based on some characteristic between said radio device and said radio access network node. The node 414 may in this case only act as the "relay" for conveying—depending on the embodiment—corresponding information (indicator) toward a radio device.

FIG. 4B shows a schematic view of radio device according to an embodiment of the present invention. Specifically, the radio device 420 may comprise a processing circuit 421, memory 423, and a communication device 422. Over the latter, the device 420 may exchange data from and to one or more radio access network nodes. Specifically, the memory 423 may comprise code to instruct the processing circuit 421 in operation to set a length of a transmission time interval (TTI) in a physical uplink control channel and to transmit control information over the physical uplink control channel with the set transmission time interval length. In further embodiments, the memory 423 may comprise code to instruct the processing circuit 421 in operation to change the transmission time interval length to be set based on a channel or payload characteristic between said radio device and said radio access network node.

According to a further embodiment, a method is provided in a communication system comprising a radio device and radio access network node, the method comprising and/or initiating a step of transmitting control information, by the radio device, over a physical uplink control channel with a set transmission time interval length, and a step of changing the transmission time interval length of the physical uplink control channel based on a channel or payload characteristic between said radio device and said radio access network node.

According to a further embodiment, a method is provided for operating a radio device capable of communicating with a radio access network node, the method comprising and/or initiating a step of transmitting control information, by the radio device, over a physical uplink control channel with a set transmission time interval length.

According to a further embodiment, a method is provided for operating a radio access network node capable of communicating with a radio device, the method comprising and/or initiating a step of changing the transmission time interval length of the physical uplink control channel based on a channel or payload characteristic between said radio device and said radio access network node.

The invention proposes mechanisms to switch between two or more different lengths of PUCCH or PUSCH to ensure good coverage of uplink control.

In general, embodiments of the present invention can improve the coverage of uplink control while also maintaining the low latency, by, for example, defining a radio device that is in short TTI operation and which may use by default the PUCCH length that is configured for the UL and DL TTI length combination, e.g. 2, 4, or 7 symbols long. This PUCCH can be used for DL HARQ and SR. To ensure low latency the chosen default can be as low as possible while fulfilling the quality requirements in the relevant channel conditions.

Further embodiments address how to transmit UCI in short TTI operation on sPUCCH. A short PUCCH, sPUCCH can be introduced to support HARQ for short DL transmissions, for fast SR and CSI, and for TDD support. The sPUCCH could be placed in the UL short TTI band, or in the vicinity of PUCCH at the end of the band. The sPUCCH resources may not cross the slot border, to allow for allocation hopping.

[A 2/3 Symbol sPUCCH]

For the short DL TTI of 2 symbols, the sPUCCH can be equally long to provide the best latency benefits. This may also allow for a simple 1-1 mapping between a DL TTI and the sPUCCH. Supporting up to 2 layers in DL, the HARQ payload is up to 2 bits, fulfilled by one DMRS followed by one BPSK/QPSK symbol that can be repeated, for example FIG. 5 illustrates an example of a 2/3 symbol sPUCCH. If SRS is transmitted in symbol 13 the last sPUCCH is dropped. R denotes DMRS and D denotes data.

Especially for SR it can be preferable from a latency perspective to have a short TTI to reduce the waiting time. SR can be indicated with channel selection of DMRS cyclic prefix. 6 such sPUCCH resources for HARQ+SR can be defined per PRB. A simple PF1-based solution with a reference symbol followed by a data symbol allows for user multiplexing.

[Observation 1] A PF1-based 2 symbol sPUCCH allows for user multiplexing. [Proposal 1] It may be defined a sPUCCH format of length 2/3 symbols, with fixed starting positions, up to 2 bit HARQ and channel selection to indicate SR.

[A 7 Symbol sPUCCH]

In addition to the shorter sPUCCH solution, a longer sPUCCH may be employed for improved coverage. For TDD operation, CSI and for CA support higher payloads may be required. A 7 symbol sPUCCH based on PF3 would fulfil the requirements on improved coverage and increased payload, and also provide sufficiently low latency. Also for 7 symbols it may be provided a sPUCCH with frequency hopping with 2 data symbols and a reference symbol repeated on two different PRBs. FIG. 6 illustrates an example of a possible design of a 7 symbol sPUCCH with frequency hopping. R denotes DMRS, D denotes data, and S denotes SRS.

Such a design may allow for multiplexing of 2 UEs with the use of an OCC over the 2 data symbols. Another sPUCCH can be defined with an alternating PRB pattern so that in total 4 sPUCCH resources can be defined with 2PRBs.

[Observation 2] A 7 symbol sPUCCH allows for frequency hopping and multiplexing of 2 UEs. [Proposal 2] It may be defied at least one high payload sPUCCH format of length 7 symbols, targeting the use case of enhanced coverage, FS2 and CA support.

For a required payload it may be assumed that for up to 2 layers in the DL transmissions, and also SR, the required payload for sPUCCH from a UE is up to 2*N+1 bits for N DL TTIs. In FDD N will be the ratio between the number of DL TTIs and the number of sPUCCH TTIs per subframe, and in TDD it will be the ratio seen over the radio frame. Under the assumption that only one UE is the receiver of a DL TTI, and that one frequency resource is used for all UEs' sPUCCH, N will also be the maximum number of UEs to multiplex on the sPUCCH. As an example for FDD, 2os DL TTI with 2os sPUCCH TTI leads to N=1, whereas 7os sPUCCH leads to N=3. In TDD configuration with 2os DL and TTI and 7os sPUCCH TTI N=4, whereas in configuration 0 N=2. When considering the maximum payload the amount of aggregated carriers may further be considered.

Further embodiments may consider the switching sPUCCH length and a default sPUCCH resource can be defined for a given sTTI length, for instance as follows (combinations of DL TTI and sPUCCH length):

|  | DL TTI length 2os | DL TTI length 3os |
|---|---|---|
| sPUCCH 2/3os | Default | Default |
| sPUCCH 7os | Coverage/Payload | Coverage/Payload |
|  | DL TTI length 4os | DL TTI length 7os |
| sPUCCH 2/3os | Default | Not supported |
| sPUCCH 7os | Coverage/Payload | Default |

[Proposal 3] The sPUCCH format can be defined for a specific short TTI configuration and UCI content.

It can be showed the improved coverage that a longer sPUCCH can give. Thus, it may be beneficial for a power limited UE to be able to switch between sPUCCH lengths: the default one for the sTTI configuration, and the longer sPUCCH. With regard to payload it can be said that for FS2 and CA many information bits may need to be transmitted. Thus, the lower payload format based on PF1 may not be suitable, and the longer format based on PF3 or PF4 can be used. [Proposal 4] It can be possible to switch to the longer sPUCCH format for improved coverage or increased payload.

For improved latency performance, SR without HARQ can be indicated on the shorter sPUCCH. If HARQ on the longer sPUCCH should be transmitted, SR is coded on this resource. For improved coverage the SR can be repeated on the short sPUCCH.

[Proposal 5] The short sPUCCH format can be used to indicate only SR without HARQ of a length of 2/3 OFDM symbols.

Based on the above, one or more further embodiments may include one or more of the following features: Defining a sPUCCH format of length 2/3 symbols, with fixed starting positions, up to 2 bit HARQ and channel selection to indicate SR; Defining at least one high payload sPUCCH format of length 7 symbols, targeting the use case of enhanced coverage, FS2 and CA support; The sPUCCH format is defined for a specific short TTI configuration and UCI content; It is possible to switch to the longer sPUCCH format for improved coverage or increased payload; The short sPUCCH format is used to indicate only SR without HARQ of a length of 2/3 OFDM symbols.

According to a further embodiment of the present invention, the length of the transmission time interval (TTI) is set to any one of 2, 4, or 7 symbols. Preferably, the length of the transmission time interval (TTI) in the physical uplink control channel may be set to any one of 2, 4, or 7 symbols, while the length of a transmission time interval (TTI) in a physical downlink control channel may be set to any one of 2, 4, or 7. Further, a length d can be defined for the transmission time interval (TTI) in a physical downlink control channel and a length u can be defined for the transmission time interval (TTI) in the physical uplink control channel, wherein (u, d) may be any one of (2, 2), (2, 7), and (7, 7).

More specifically, there can be supported for the combination of sTTI for DL and UL one or more of the following alternatives: Alternative 1: (2, 2), (7, 7); Alternative 2: (2, 2), (2, 4), (7, 7); Alternative 3: (2, 2), (2, 7), (7, 7); Alternative 4: (2, 2), (2, 4), (2, 7), (7, 7). Where here (a, b) denotes (DL sTTI length, UL sTTI length), DL sTTI length is used for sPDCCH and sPDSCH, and UL sTTI length is used for sPUSCH and sPUCCH corresponding to sPDCCH and sPDSCH, respectively. Further (2, 14) and/or (7, 14) may be adopted. Yet further, the radio device (UE) may be configured by higher layers to operate one of the following sTTI combination (DL, UL) within a PUCCH group: (2, 2), (2, 7) and (7, 7).

According to a further embodiment, a 1-symbol PUCCH without SR can be employed with 1 or 2 bit(s) UCI payload size. Preferably, RS and UCI can be multiplexed by FDM manner in the OFDM symbol, wherein UCI can be sequence, and for FFS a low PAPR design can be applied. Alternatively, a sequence selection can be employed with low PAPR, if only SR is applied or if SR and other UCI is applied. This may not imply the necessity of special SR design. According to a further embodiment, a 2-symbol NR-PUCCH can be employed, where one of the following options can be considered that include a possible down-selection: Option 1: A 2-symbol NR-PUCCH can be composed of two 1-symbol NR-PUCCHs conveying the same UCI, where the same UCI can be repeated across the symbols using repetition of a 1-symbol NR-PUCCH or the UCI can be encoded and the encoded UCI bits are distributed across the symbols. Option 2: A 2-symbol NR-PUCCH can be composed of two symbols conveying different UCIs, for example as a time-sensitive UCI (e.g., HARQ-ACK) in the second symbol. Further, two NR-PUCCHs can be transmitted from one radio device (UE) on the same slot in TDM manner, wherein the two NR-PUCCHs can be short-PUCCH, the two NR-PUCCHs can be long-PUCCH+short-PUCCH, the two NR-PUCCHs can be implemented as long-PUCCH+long-PUCCH, other multiplexing scheme(s) can be employed between the two NR-PUCCHs, and/or more than 2 NR-PUCCHs can be employed in one slot from a radio device (UE). However, if there are more than 2, then only short-PUCCHs may be employed.

According to a further embodiment, a structure of PUCCH in long-duration can be employed. Specifically, for a long duration NR-PUCCH in a given slot, special PUCCH formats can be employed as, for example, LTE PUCCH 1a/1b for small UCI payload with 1 or 2 bit(s), especially in light of the number of symbols available for NR-PUCCH, time domain OCC over allocated multiple symbols, LTE PUCCH format 4 or PUCCH for large UCI payload with a specific number of bits, (virtual) frequency domain OCC. Further the scalability of NR-PUCCH for different number of symbols available for NR-PUCCH can be considered. Yet further, the set of the number of symbols for long duration NR-PUCCH in a slot can be any subset of or the full set of (4, 5, 6, 7, 8, 9, 10, 11, 12, 13, 14.

Although detailed embodiments have been described, these only serve to provide a better understanding of the invention defined by the independent claims and are not to be seen as limiting.

The invention claimed is:

1. A method performed by a mobile radio device that communicates with a radio access network node, the method comprising:
   setting, in the radio device, a length of a transmission unit in a short physical uplink control channel (sPUCCH) to a first number of symbols, wherein the sPUCCH is less than a full sub-frame;
   autonomously changing the length of the transmission unit in the sPUCCH from the first number of symbols to a second number of symbols based on an amount of control information to be transmitted in the transmission unit to the radio access network node over the sPUCCH; and
   transmitting the control information to the radio access network node over the sPUCCH using the second number of symbols as the length of the transmission unit,
   wherein autonomously changing the length of the transmission unit in the sPUCCH from the first number of symbols to the second number of symbols comprises:
      determining acknowledgments for communications received in two or more downlink short transmission units can be multiplexed in the same transmission unit in sPUCCH; and
      autonomously changing the length of the transmission unit in the sPUCCH from the first number of symbols to the second number of symbols further based on the determination that control information associated with communications received in the two or more downlink short transmission units can be multiplexed in the same transmission unit in sPUCCH.

2. The method of claim 1, further comprising:
   receiving, from the radio access network node, an indicator that indicates the first number of symbols to set as the length of the transmission unit.

3. The method of claim 2, wherein said indicator is a bit field in downlink control information (DCI).

4. The method of claim 3, wherein autonomously changing the length of the transmission unit is further based on the last decoded downlink control information (DCI) or last decoded aggregation level (AL).

5. The method of claim 3, wherein autonomously changing the length of the transmission unit is further based on the last decoded downlink control information (DCI) or last decoded aggregation level (AL) within a time span before the transmission of the control information to the radio network access node.

6. The method of claim 2, wherein said indicator is an aggregation level (AL) of downlink control information (DCI).

7. The method of claim 6, further comprising:
   assessing a DCI message or an AL level that were used to schedule downlink transmissions which the mobile radio device performs Hybrid Automatic Repeat Request (HARQ) feedback on; and
   wherein autonomously changing the length of the transmission unit is further based on the HARQ feedback based on the latest physical downlink control channel transmissions.

8. The method of claim 1, further comprising:
   receiving a number of layers in downlink transmission from the radio access network node; and
   wherein autonomously changing the length of the transmission unit is further based on the received number of layers from the radio access network node.

9. The method of claim 1, wherein autonomously changing the length of the transmission unit is further based on a transmission configuration used by the mobile radio device during radio resource control (RRC) signaling.

10. The method of claim 1, further comprising measuring a channel quality of a channel between the mobile radio device and the radio access network node.

11. The method of claim 10, wherein the measured channel quality comprises a reference signal received power (RSRP) or a channel quality indicator (CQI).

12. The method of claim 1, wherein the second number of symbols comprises a longest transmission unit length that is used for the length of the transmission unit until the mobile radio device has decoded downlink control information (DCI) received from the radio access network node.

13. The method of claim 1, wherein the second number of symbols comprises a shortest transmission unit length that is used for a scheduling request (SR); and the method further comprising:
   increasing the length of the transmission unit for a next scheduling request (SR) if no scheduling is performed within a predetermined time interval.

14. The method of claim 1, wherein the second number of symbols comprises a longer length; and the method further comprising:
   transmitting uplink control information data over a longer sPUCCH.

15. The method of claim 1, wherein transmitting the control information to the radio access network node over the sPUCCH using the second number of symbols as the length of the transmission unit comprises:
   multiplexing the control information associated with the communications received in the two or more downlink short transmission units; and
   transmitting the multiplexed control information to the radio access network node over the sPUCCH using the second number of symbols as the length of the transmission unit.

16. A method performed by a radio access network node that communicates with a mobile radio device, the method comprising:
- setting a length of a transmission unit in a short physical uplink control channel (sPUCCH) between the radio access network node and the radio device as a first number of symbols, wherein the sPUCCH is less than a full sub-frame;
- transmitting, toward the mobile radio device, an indicator of the first number of symbols as the length of the transmission unit of the sPUCCH; and
- receiving, from the mobile radio device, control information in the sPUCCH with the length of transmission unit autonomously changed to a second number of symbols by the mobile radio device based on an amount of the control information received from the mobile radio device over the sPUCCH, wherein the control information comprises acknowledgments multiplexed into the same transmission unit in sPUCCH for communications transmitted to the mobile radio device in two or more downlink short transmission units.

17. The method of claim 16, wherein said indicator is a bit field in downlink control information (DCI).

18. The method of claim 16, wherein said indicator is an aggregation level (AL) of downlink control information (DCI).

19. The method of claim 16, further comprising:
- setting a number of layers in downlink transmission, wherein said number is in relation to said first number of symbols as the length of the transmission unit.

20. The method of claim 16, wherein the indicator is transmitted to the mobile radio device as part of a transmission configuration using radio resource control (RRC) signaling.

21. The method of claim 16, further comprising:
- measuring a channel quality of channel between the mobile radio device and the radio access node; and
- wherein setting the length of the transmission unit to the first number of symbols is based on said measured channel quality.

22. The method of claim 16, wherein, in the step of setting, said first number of symbols as the length of the transmission unit is set to a length of any one of 1 to 13 symbols.

23. The method of claim 16, wherein said first number of symbols are orthogonal frequency division multiplexing (OFDM) symbols or single carrier frequency division multiple access (SC-FDMA) symbols.

24. The method of claim 16, wherein the control information further comprises information relating to a hybrid automatic repeat request (HARM) and/or a scheduling request (SR) from the radio device.

25. The method of claim 16, wherein setting the length of the transmission unit to the first number of symbols is based on a channel condition between said mobile radio device and said radio access network node.

26. The method of claim 16, wherein the first number of symbols of the length of the transmission unit is set to any one of 2, 4, or 7 symbols.

27. The method of claim 16, wherein the first number of symbols of the length of the transmission unit in the physical uplink control channel is set to any one of 2, 4, or 7 symbols, while a third number of symbols of a length of a transmission unit in a physical downlink control channel is set to any one of 2, 4, or 7.

28. The method of claim 16, wherein a length d of a transmission unit in a physical downlink control channel and the default length u of the transmission unit in the physical uplink control channel are set to (u, d) being any one of (2, 2), (2, 7), and (7, 7) symbols.

29. A mobile radio device configured to communicate with a radio access network node, the mobile radio device comprising:
- a processing circuit and a memory, the memory storing code that when executed by the processing circuit causes the processing circuit to operate to:
  - set, in the mobile radio device, a length of a transmission unit in a short physical uplink control channel (sPUCCH) to a first number of symbols, wherein the sPUCCH is less than a full sub-frame; and
  - autonomously change the length of the transmission unit in the sPUCCH from the first number of symbols to a second number of symbols based on an amount of control information to be transmitted to the radio access network node over the sPUCCH;
  - transmit the control information to the radio access network node over the sPUCCH using the second number of symbols as the length of the transmission unit,
- wherein autonomously change the length of the transmission unit in the sPUCCH from the first number of symbols to the second number of symbols comprises:
  - determine acknowledgments for communications received in two or more downlink short transmission units can be multiplexed in the same transmission unit in sPUCCH; and
  - autonomously change the length of the transmission unit in the sPUCCH from the first number of symbols to the second number of symbols further based on the determination that control information associated with communications received in the two or more downlink short transmission units can be multiplexed in the same transmission unit in sPUCCH.

30. A radio access network node configured to communicate with a mobile radio device, the radio access node comprising:
- a processing circuit and a memory, the memory storing code that when executed by the processing circuit causes the processing circuit to operate to:
  - set a length of a transmission unit in a short physical uplink control channel (sPUCCH) between the radio access network node and the mobile radio device as a first number of symbols, wherein the sPUCCH is less than a full sub-frame; and
  - transmit, toward the mobile radio device, an indicator of the first number of symbols as the length of the transmission unit of the sPUCCH; and
  - receive, from the mobile radio device, control information in the sPUCCH with the length of transmission unit autonomously changed to a second number of symbols by the mobile radio device based on an amount of the control information received from the mobile radio device over the sPUCCH, wherein the control information comprises acknowledgments multiplexed into the same transmission unit in sPUCCH for communications transmitted to the mobile radio device in two or more downlink short transmission units.

* * * * *